Jan. 6, 1970    J. H. HOLLYDAY    3,487,613
CHOPPER AND BALER ASSEMBLY
Filed Dec. 22, 1966    4 Sheets-Sheet 1

INVENTOR.
JAMES H. HOLLYDAY
BY
Donald D. Schaper
ATTORNEY

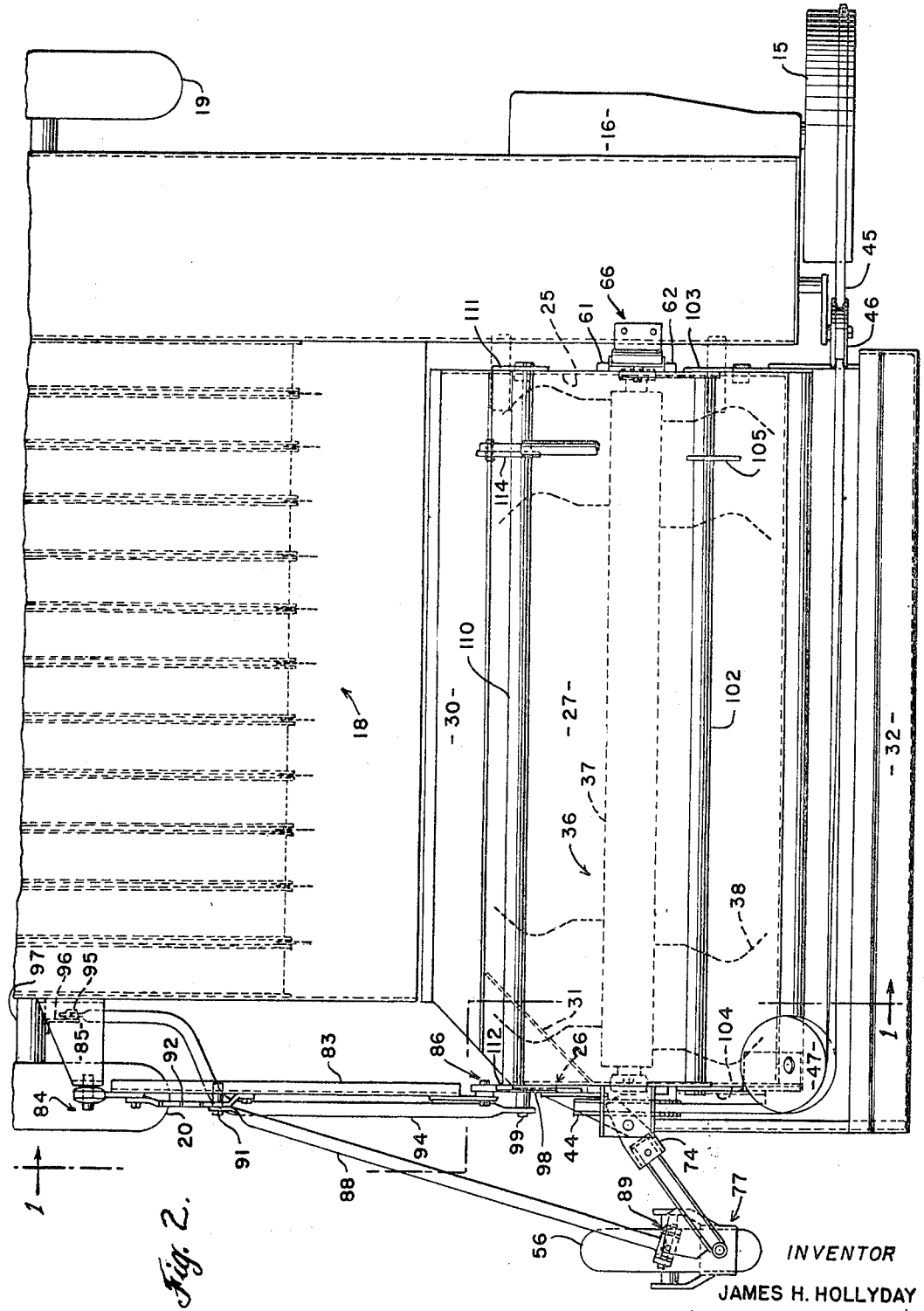

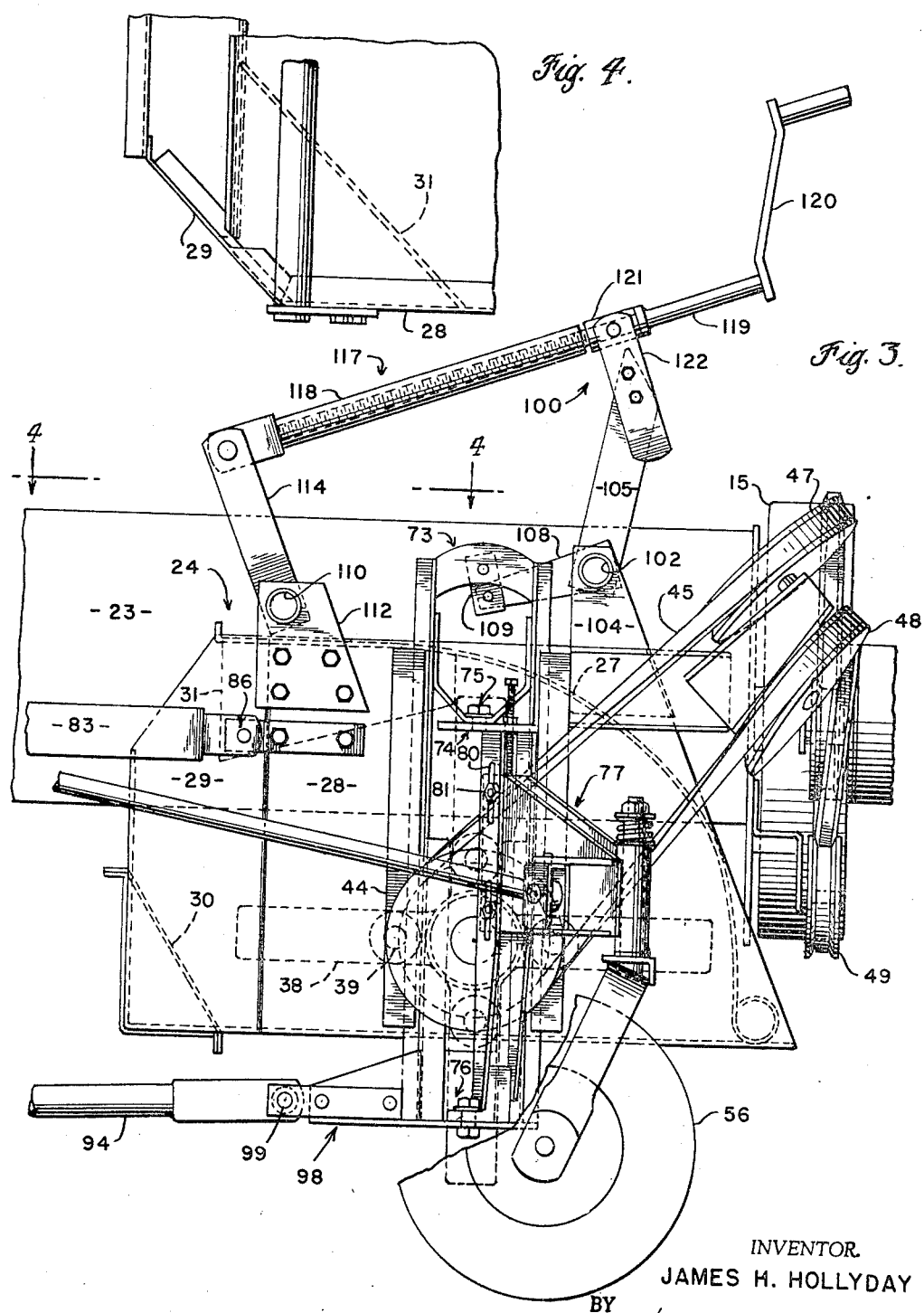

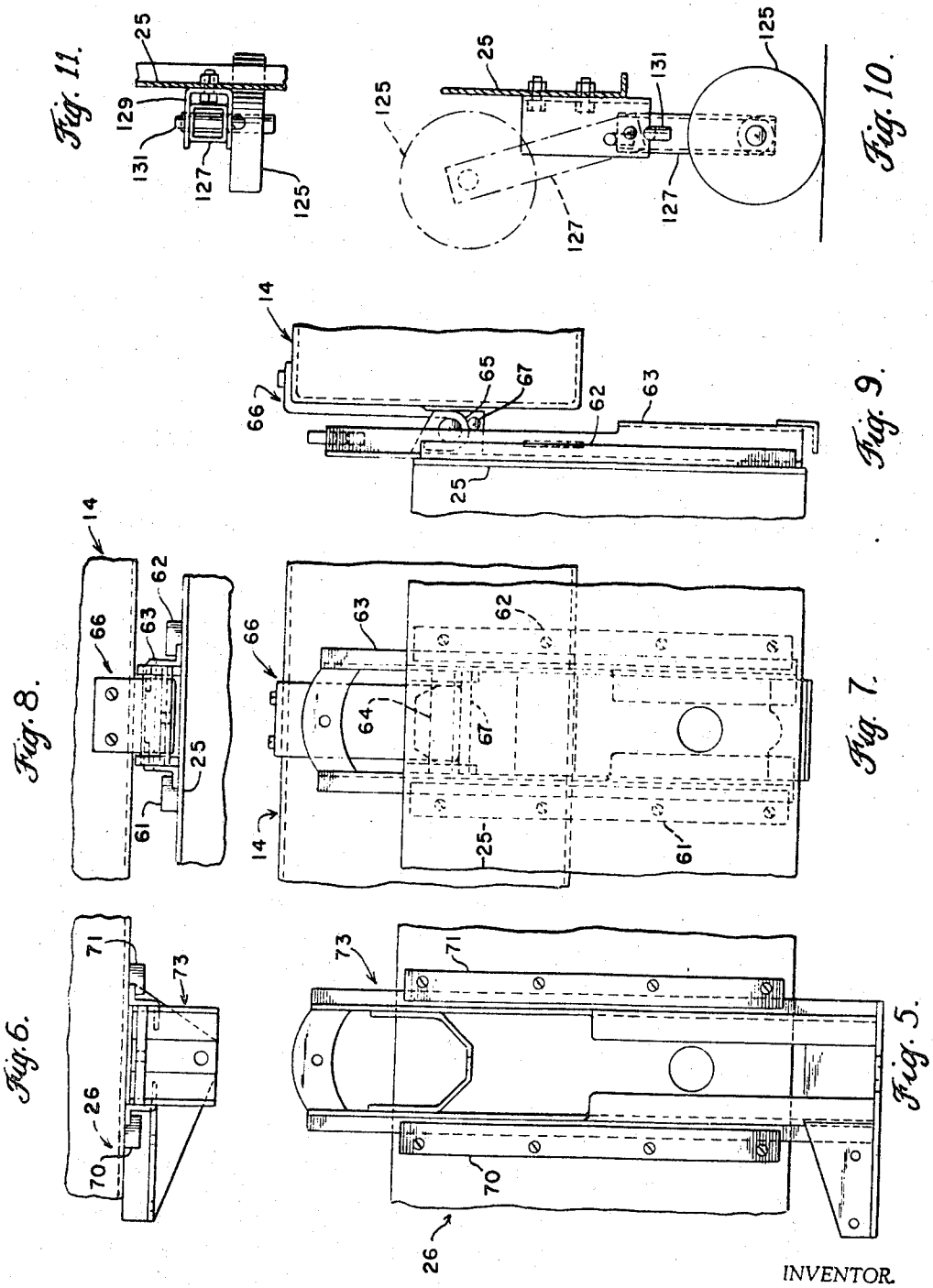

United States Patent Office 3,487,613
Patented Jan. 6, 1970

3,487,613
CHOPPER AND BALER ASSEMBLY
James H. Hollyday, New Holland, Pa., assignor to Sperry Rand Corporation, New Holland, Pa., a corporation of Delaware
Filed Dec. 22, 1966, Ser. No. 603,856
Int. Cl. A01d 43/00, 39/00
U.S. Cl. 56—24                     1 Claim

ABSTRACT OF THE DISCLOSURE

An agricultural machine having a rotary flail type cutter for cutting standing crop material from a field and a baling mechanism for forming the severed crop material into bales in which the flail cutter is removably and adjustably connected to the baler.

BACKGROUND OF THE INVENTION

This invention is particularly applicable to a means for connecting and disconnecting a chopper unit to a baler unit and for adjustably holding the chopper unit thereon.

A relatively recent development in the harvester art has been a machine which is adapted to cut and/or collect crop material from a field and form it into bales. In most machines of this type, a chopper unit is detachably mounted to a conventional pick-up baler. There are two general arrangements for mounting the chopper unit to the baler. In one arrangement, the rotatable pick-up is removed from the baler and a chopper unit is mounted in place of the pick-up. In the other arrangement, the chopper is mounted forwardly of the baler pick-up, and the crop material is directed over the pick-up and into the baler.

The baler and chopper machines described above are normally used only a few days out of the year—usually in the fall to bale corn stalks and like material to be used for bedding for farm animals. For the remainder of the year, the baler unit functions as a conventional pick-up baler. Thus, it is important to the farmer to have a chopper unit which requires a minimum of time and effort to attach and detach from his baler. It is also important to have a chopper unit which can be easily adjusted in the field.

SUMMARY OF THE INVENTION

This invention is directed to a mechanism for connecting a chopper unit to a baler unit and for adjustably holding the chopper unit in place. The chopper unit of this invention is pivotally mounted to the bale case at its inboard end and is adjustably supported on a castor wheel at its outboard end. A pair of slider plates fixed respectively to the bale case and to the castor wheel are slidably received in track means on the side walls of the chopper housing. Actuating means is provided to move the chopper housing relative to the slider plates to effect a vertical adjustment of the chopper housing.

When it is desired to detach the chopper unit from the baler unit, the pivotal connection at the bale case is disconnected, and dolly wheels carried on the chopper housing inboard side wall are pivoted to a down position to support the inboard side of the chopper. The chopper unit can then be towed away from the baler unit on the dolly wheels and the castor wheels.

A principal object of this invention is to provide an improved means for connecting and disconnecting a chopper unit to a baler unit.

Another object of this invention is to provide a means for connecting and disconnecting a chopper unit from a baler unit wherein the operation can be accomplished without the need for hoists or jacks.

Another object of this invention is to provide a novel lift system for the chopper unit in a machine of the type described.

A further object of this invention is to provide a chopper lift system which is readily accessible to the tractor operator.

A still further object of this invention is to provide a chopper unit having an adjustable ground wheel wherein the wheel can be adjusted laterally and vertically relative to the chopper housing.

Other objects and advantages of this invention will be apparent hereinafter from the specification and from the recital in the appended claim.

BRIEF DESCRIPTION OF THE DRAWINGS

FIG. 2 is a plan view of the machine, substantially as shown in FIG. 1, showing the means for attaching the chopper unit to the baler unit;

FIG. 3 is an enlarged fragmentary elevational view, as viewed from the left in FIG. 2;

FIG. 4 is a fragmentary plan view, taken as indicated by the line 4—4 in FIG. 3;

FIG. 5 is a detailed view of the support assembly on the outboard side wall of the chopper housing;

FIG. 6 is a plan view of FIG. 5;

FIG. 7 is a detailed view of the support assembly on the inboard side wall of the chopper housing;

FIG. 8 is a plan view of FIG. 7;

FIG. 9 is a side view of FIG. 7, looking toward the left in FIG. 7;

FIG. 10 is a detailed view of the forward dolly wheel and showing the operative and inoperative positions of the wheel, the view being taken on line 10—10 in FIG. 1; and FIG. 11 is a plan view of FIG. 10.

DESCRIPTION OF THE PREFERRED EMBODIMENT

Figure 1:
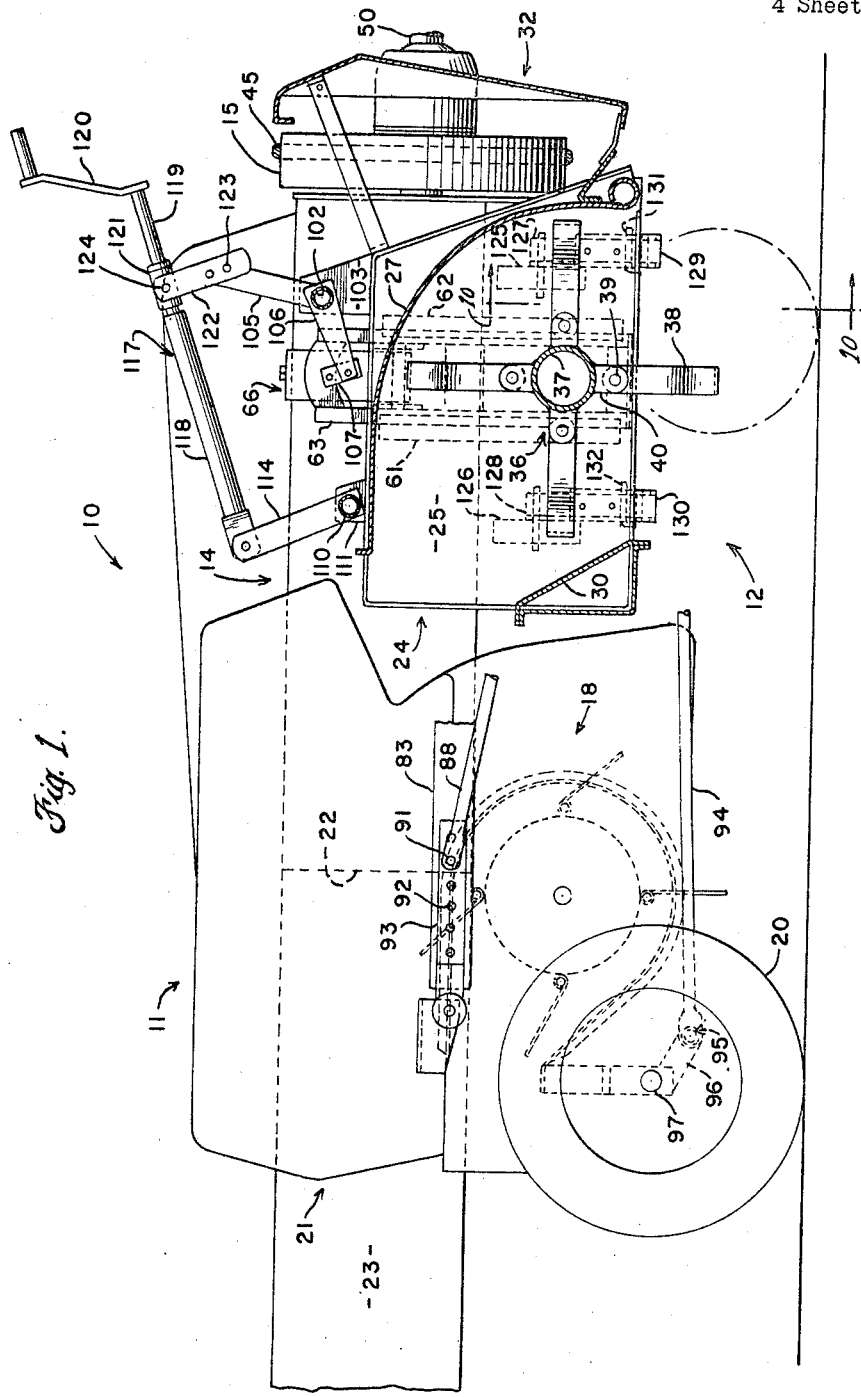
FIG. 1 is a sectional elevational view of the machine, taken approximately on the line 1—1 of FIG. 2, showing the baler unit and the chopper unit mounted thereto.

Referring now to the drawings by numerals of reference and particularly to FIG. 1, the machine of this invention is designated generally 10. Machine 10 comprises a baler unit 11 of conventional construction and a chopper unit 12.

Baler unit 11 comprises a bale case 14, a reciprocating plunger, not shown, movable in the bale case, a flywheel 15 mounted on the forward end of bale case 14 for driving the plunger through a gearbox 16, a rotatable pick-up 18, and ground wheels 19 and 20. A feed chamber 21 is located rearwardly of pick-up 18 and is in communication with a feed opening 22 in an upright side wall 23 of bale case 14. Feeder means, not shown, sweep crop material across the floor of feed chamber 21 and into the bale case. An example of the type of feeder means referred to is shown in the U.S. patent to Nolt et al., 3,115,823. It will be apparent to those skilled in the art that crop material fed into the bale case through feed opening 22 is compressed by the reciprocating plunger and formed into bales, and tying means, not shown, serves to bind the crop material with wire or string.

Chopper unit 12 comprises a housing 24 having an open bottom and including an inboard side wall 25 adjacent bale case 14, an outboard side wall 26 laterally spaced from the inboard side wall, and an arcuate top wall 27 extending between and joining the side walls. Outboard side wall 26 is formed from a generaly fore-and-aft extending forward wall portion 28 and an inwardly extending rear wall portion 29. At the rear end of housing 24, a reinforcing member 30 extends between the side walls 25 and 26.

Deflector means, as shown in FIG. 4, comprises wall portion 29 and a deflector plate 31 which extends downwardly from top wall 27 and is fixed thereto, as by welding. Deflector plate 31 is generally parallel to rear wall portion 29, and it cooperates with the wall portion to guide crop material inwardly toward pick-up 18. At the forward end of the chopper housing, a vertically extending shield 32 is mounted to engage standing crop material and direct the material into the chopper housing. Shield 32 is spaced from the housing 24, as shown in FIG. 2, to allow trash which passes over the shield to fall through to the ground.

A chopper rotor 36, as shown in FIGS. 1–3, is journalled in side walls 25 and 26 and comprises a central shaft 37, and a plurality of flail-like chopper knives 38. Chopper knives 38 are pivotally mounted in spaced relation on bars 39. Bars 39 are removably mounted in lugs 40 which are fixed to shaft 37 and extend radially therefrom.

Chopper rotor 36 is powered through a drive sheave 44 which is secured to the outboard end of the rotor central shaft 37 and is driven by means of a belt 45 connected to flywheel 15. From flywheel 15, belt 45 extends under a sheave 46 on bale case 14, around a first guide sheave 47 on housing 24 at the outboard end thereof, and then to drive sheave 44; from sheave 44, belt 45 moves around a second guide sheave 48 on housing 24 and located directly under guide sheave 47, over a second sheave 49 on bale case 14, and then back to flywheel 15. Flywheel 15 receives its power through a PTO shaft 50, shown fragmentarily in FIG. 1, which is connected to the tractor, not shown.

Chopper unit 12 is supported by an inboard support assembly adjacent bale case 14 and an outboard support assembly spaced laterally therefrom. The inboard support assembly, as shown in FIGS. 1 and 7–9, comprises a pair of tracks 61 and 62 affixed to side wall 25, and a slider plate 63 slidably mounted in the tracks. Slider plate 63 comprises an integrally formed cross piece 64 which is received in a U-shaped portion 65 of a bracket 66 fixed to bale case 14. A removable pin 67 locks the slider plate in place on bracket 66. A lift system, hereinafter described, is provided for adjustably moving the chopper housing 24 relative to slider plate 63.

The chopper unit outboard support assembly, as shown in FIGS. 3, 5, and 6, comprises a pair of tracks 70 and 71 on side wall 26, and a slider plate 73 which is mounted for movement in tracks 70 and 71. A wheel mounting fixture 74 (see FIG. 3) is pivotally mounted at 75 and 76 to slider plate 73; and a wheel support 77, which carries ground wheel 56, is adjustably mounted in fixture 74 by means of slots 80 and fasteners 81.

With reference to FIG. 2, a stabilizer bar 83 is shown which serves to maintain the outboard end of the chopper in the desired fore-and-aft position. Bar 83 is pinned at 84 to a mounting bracket 85 on the feed chamber housing and is fixed to chopper housing 24 at 86. A first push rod 88 is pivotally connected to wheel support 77 at 89; the rear end of rod 88 comprises a fastener 91 which can be adjustably positioned in one of the holes 92 in element 93 fixed to stabilizer bar 83. It will be seen that wheel 56 can be positioned closer to, or further away from, chopper housing 24 by moving fastener 91 to a different one of the holes 92. A second push rod 94 is pinned at 95 to an element 96 fixed to baler axle 97, and at its forward end, it is connected to tab 98 by a fastener 99.

A lift system 100 is mounted on chopper housing 24 and provides for movement of the housing relative to plates 73 and 63 to effect a vertical adjustment of the chopper. Lift system 100 comprises a rockshaft 102 pivotally mounted in brackets 103 and 104 at the forward end of the chopper. An upwardly extending arm 105 carried on rockshaft 102 is connected to actuating means, described below, for pivotally moving the rockshaft. A lever 106 connects rockshaft 102 to plate 63 through a link 107 pivotally mounted to lever 106 and plate 63, and a lever 108 connects the rockshaft to plate 73 at the outboard end through another pivotally mounted link 109. A support for the actuating means is provided at the rear end of the chopper and comprises a stationary tube 110 mounted to chopper housing by means of elements 111 and 112, and a generally vertically extending element 114.

Actuating means for the lift system 100 is provided by a screw jack 117 comprising an internally threaded cylinder 118, and a screw rod 119 having a handle 120 mounted on its forward end. A collar 121 is fixed against axial movement on rod 119 and is pivotally connected to a member 122 on arm 105. The actuating means is so located that handle 120 can be easily reached by the operator. It is contemplated that screw jack 117 could be replaced by a conventional hydraulic actuator, in the event a hydraulic system is available.

An additional feature of this invention is a support means carried on inboard side wall 25 and adapted to support the chopper unit when in storage and when the unit is being connected or disconnected. This support means comprises a pair of dolly wheels 125 and 126, mounted on opposite sides of the chopper shaft 37 and carried respectively on struts 127 and 128. Strut 127 is pivotally mounted in bracket 129 on the housing side wall 25, and strut 128 is similarly mounted in bracket 130. Pins 131 and 132 are provided to lock the wheels 125 and 126 in an adjusted position.

In operation, machine 10 is drawn through a field in a forward direction by a tractor, not shown. The various components of the chopper and the baler units are driven by the tractor power take-off through PTO shaft 50. Chopper knives 38 serve to sever the crop material and fling it upward and rearward to the baler pick-up 18. The baler pick-up 18 slows the crop material down, aligns it, and uniformly delivers it to the feed chamber 21. From the feed chamber, the stalks are fed into the bale case where they are compressed and formed into bales.

When the operator desire to detach the chopper unit 12 from baler unit 11, he will first disconnect the push rods 88 and 94 and the stabilizer bar 83 from the baler unit. He will next position the dolly wheels in a down position adjacent the ground and lock them in this position. Locking pin 67 in mounting bracket 66 on the bale case can now be removed. Then, handle 120 is rotated in a direction to lower the chopper housing. As soon as the dolly wheels make contact with the ground, the slider plate 63 at the inboard end will start to raise and element 64 will be moved out of U-shaped portion 65 on bracket 66. Then, the chopper unit can be pulled away from the baler unit.

From the foregoing description, it will be seen that the chopper unit of this invention can be connected and disconnected without the need for jacks or hoists. Further, the disclosed dolly wheels can be used to support the unit in storage.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains.

Having thus described my invention, what I claim is:

1. An agricultural machine adapted to travel in a forward direction, said machine comprising:
   a wheel-supported frame;
   a fore-and-aft extending upright wall on said frame;
   a chopper housing, said housing having an inboard side wall adjacent said upright wall and an outboard side wall spaced laterally therefrom, and a laterally extending top wall joining said side walls, said top wall having a forward laterally extending end and rearward laterally extending end;

a rotor journalled in said inboard and outboard side walls;

support means for maintaining said chopper housing and said rotor carried thereby in an operative position, said support means comprising first and second track means on a respective side wall, a first plate movable in said first track means on said inboard side, and a second plate movable in said second track means on the outboard side wall;

connecting means fixing said first plate to said upright wall;

a ground wheel;

means for securing said ground wheel to said second plate; and lift means having
first and second transversely extending rocker shafts,
means for rotatably mounting said first shaft along said forward end of said top wall, means for rotatably mounting said second shaft along said rearward end of said top wall,
first lever means mounted on said first shaft and pivotally connected to said first and second plate means,
second upward extending lever means connected to said second shaft,
third upwardly extending lever means connected to said first shaft,
actuating means pivotally connected to said second and third lever means to oppositely rotate said first and second shafts for adjustably supporting said chopper housing and rotor by said mounting means, lever means, shaft, plates and actuating means on said upright side wall and said ground wheel.

References Cited

UNITED STATES PATENTS

| 2,116,825 | 5/1938 | Crescent | 280—43.22 X |
| 2,577,885 | 12/1951 | Gray | 280—43.22 X |
| 2,696,772 | 12/1954 | Underdown | 280—43.2 |
| 3,008,731 | 11/1961 | Lisota | 280—150.5 |
| 3,159,959 | 12/1964 | Mathews | 56—24 |
| 3,253,839 | 5/1966 | Warren | 280—150.5 |
| 3,362,144 | 1/1968 | Bumgardner | 56—341 X |

RUSSELL R. KINSEY, Primary Examiner

U.S. Cl. X.R.

56—341